(12) United States Patent
Muldoon et al.

(10) Patent No.: US 11,994,038 B2
(45) Date of Patent: May 28, 2024

(54) TURBINE ENGINE MODULE WITH ELECTRIC MACHINE

(71) Applicant: Raytheon Technologies Corporation, Farmington, CT (US)

(72) Inventors: Marc J. Muldoon, Marlborough, CT (US); Russell B. Witlicki, Wethersfield, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 17/967,460

(22) Filed: Oct. 17, 2022

(65) Prior Publication Data
US 2023/0212959 A1   Jul. 6, 2023

Related U.S. Application Data (60) Provisional application No. 63/256,349, filed on Oct. 15, 2021.

(51) Int. Cl.
| | |
|---|---|
| *F01D 25/18* | (2006.01) |
| *F01D 25/16* | (2006.01) |
| *F02C 6/20* | (2006.01) |

(52) U.S. Cl.
CPC ........... *F01D 25/183* (2013.01); *F01D 25/16* (2013.01); *F02C 6/20* (2013.01);
(Continued)

(58) Field of Classification Search
CPC .......... F01D 25/183; F01D 25/16; F02C 6/20; F05D 2220/323; F05D 2220/70; F05D 2240/54; F05D 2240/55; F05D 2260/98
(Continued)

(56) References Cited

U.S. PATENT DOCUMENTS

| | | |
|---|---|---|
| 9,018,821 B2 | 4/2015 | Stiesdal |
| 9,917,490 B2 | 3/2018 | Lemmers |

(Continued)

FOREIGN PATENT DOCUMENTS

| | | | |
|---|---|---|---|
| EP | 3447243 A1 * | 2/2019 | ............ F01D 1/24 |
| EP | 3544152 B1 | 10/2020 | |
| WO | 2020084241 A1 | 4/2020 | |

OTHER PUBLICATIONS

"American National Standard Design Manual for Enclosed Epicyclic Gear Drives", ANSI/AGMA 6023-A88, Nov. 1988.
EP search report for EP22201983.8 dated Mar. 3, 2023.

*Primary Examiner* — Devon C Kramer
*Assistant Examiner* — Kelsey L Stanek
(74) *Attorney, Agent, or Firm* — Getz Balich LLC (57) ABSTRACT

An assembly is provided for a turbine engine. This turbine engine assembly includes a first rotating structure, a turbine engine apparatus, a rotating coupler and a seal assembly. The first rotating structure is configured to rotate about a rotational axis. The turbine engine apparatus includes an electric machine and a second rotating structure. The electric machine includes an electric machine rotor and an electric machine stator. The second rotating structure is configured to rotate about the rotational axis and is coupled to the electric machine rotor. The rotating coupler is coupled to the first rotating structure by a first connection. The rotating coupler is coupled to the second rotating structure by a second connection. The seal assembly includes a rotating seal land and a stationary seal element. The rotating seal land is mounted onto the rotating coupler. The stationary seal element sealingly engages the rotating seal land.

20 Claims, 10 Drawing Sheets

(52) U.S. Cl.
CPC .... *F05D 2220/323* (2013.01); *F05D 2220/70* (2013.01); *F05D 2240/54* (2013.01); *F05D 2240/55* (2013.01); *F05D 2260/98* (2013.01)

(58) Field of Classification Search
USPC ........................................................ 415/230
See application file for complete search history.

(56) References Cited

U.S. PATENT DOCUMENTS

| | | |
|---|---|---|
| 10,071,811 B2 | 9/2018 | Kupiszewski |
| 10,308,366 B2 | 6/2019 | Kupiszewski |
| 10,487,839 B2 * | 11/2019 | Kupiszewski ............ F01D 5/02 |
| 10,801,410 B2 | 10/2020 | Roberge |
| 11,085,515 B2 * | 8/2021 | Moniz ................. F16H 57/0471 |
| 2018/0050806 A1 * | 2/2018 | Kupiszewski .......... F01D 25/18 |
| 2019/0085715 A1 | 3/2019 | Van Der Merwe |
| 2020/0003157 A1 | 1/2020 | Clements |
| 2020/0063606 A1 * | 2/2020 | Miller ....................... F02K 5/00 |
| 2021/0010382 A1 | 1/2021 | Davies |
| 2021/0010383 A1 | 1/2021 | Bradley |
| 2021/0010384 A1 | 1/2021 | Bradley |
| 2021/0018008 A1 | 1/2021 | Muldoon |
| 2021/0079850 A1 | 3/2021 | Davies |
| 2023/0120797 A1 * | 4/2023 | Muldoon ................. F02C 7/32 |
| | | 60/39.08 |

* cited by examiner

TURBINE ENGINE MODULE WITH ELECTRIC MACHINE

This application claims priority to U.S. Patent Appln. No. 63/256,349 filed Oct. 15, 2021, which is hereby incorporated herein by reference in its entirety.

BACKGROUND OF THE DISCLOSURE

1. Technical Field

This disclosure relates generally to a turbine engine and, more particularly, to an electric machine for a turbine engine.

2. Background Information

A gas turbine engine may include an electric machine for providing mechanical power and/or electricity. The electric machine is typically connected to a gearbox outside of a core of the engine, where the gearbox is coupled with a rotor within the engine core via a tower shaft. Some efforts have been made to arrange the electric machine within the engine core to reduce overall size of the gas turbine engine. There is a need in the art, however, for structures and architectures which facilitate arrangement of the electric machine within the engine core.

SUMMARY OF THE DISCLOSURE

According to an aspect of the present disclosure, an assembly is provided for a turbine engine. This turbine engine assembly includes a first rotating structure, a turbine engine apparatus, a rotating coupler and a seal assembly. The first rotating structure is configured to rotate about a rotational axis. The turbine engine apparatus includes an electric machine and a second rotating structure. The electric machine includes an electric machine rotor and an electric machine stator. The second rotating structure is configured to rotate about the rotational axis and is coupled to the electric machine rotor. The rotating coupler is coupled to the first rotating structure by a first connection. The rotating coupler is coupled to the second rotating structure by a second connection. The seal assembly includes a rotating seal land and a stationary seal element. The rotating seal land is mounted onto the rotating coupler. The stationary seal element sealingly engages the rotating seal land.

According to another aspect of the present disclosure, another assembly is provided for a turbine engine. This turbine engine assembly includes a turbine engine shaft, a turbine engine module, a rotating coupler and a seal assembly. The turbine engine shaft is configured to rotate about a rotational axis. The turbine engine module includes an electric machine and a gearbox. The electric machine includes an electric machine rotor and an electric machine stator. The gearbox includes a rotating structure coupled to the electric machine rotor. The rotating structure is configured to rotate about the rotational axis. The rotating coupler is coupled to the turbine engine shaft by a coupler-shaft connection. The rotating coupler is coupled to the rotating structure by a coupler-gearbox connection. The seal assembly includes a rotating seal land and a stationary seal element. The rotating seal land is mounted onto the rotating coupler. The stationary seal element sealingly engages the rotating seal land.

According to still another aspect of the present disclosure, another assembly is provided for a turbine engine. This turbine engine assembly includes a gearbox, a turbine engine module and a rotating coupler. The gearbox includes a gearbox rotating structure configured to rotate about a rotational axis. The turbine engine module includes an electric machine and a rotating structure. The electric machine includes an electric machine rotor and an electric machine stator. The rotating structure is configured to rotate about the rotational axis. The rotating structure includes or is coupled to the electric machine rotor. The rotating coupler is coupled to the gearbox rotating structure by a coupler-gearbox connection. The rotating coupler is coupled to the rotating structure by a coupler-electric machine connection. The seal assembly includes a rotating seal land and a stationary seal element. The rotating seal land is mounted onto the rotating coupler. The stationary seal element sealingly engages the rotating seal land.

The turbine engine assembly may also include a bearing, a first lubricant circuit and a second lubricant circuit. The bearing may rotatably support the turbine engine shaft. The first lubricant circuit may be configured to provide lubricant to the turbine engine module. The second lubricant circuit may be configured to provide lubricant to the bearing.

The turbine engine assembly may also include a first lubricant circuit and a second lubricant circuit. The first lubricant circuit may be configured to provide lubricant to the gearbox. The second lubricant circuit may be configured to provide lubricant to the electric machine.

The electric machine may be configurable as a motor during a motor mode of operation. The electric machine may also or alternatively be configurable as a generator during a generator mode of operation.

The rotating seal land may be arranged axially between the first connection and the second connection along the rotational axis.

The turbine engine assembly may also include a bearing, a first lubricant circuit and a second lubricant circuit. The bearing may rotatably support the first rotating structure. The first lubricant circuit may be configured to provide lubricant to the electric machine. The second lubricant circuit may be configured to provide lubricant to the bearing.

The turbine engine assembly may also include a lubricant source fluidly coupled in parallel with the first lubricant circuit and the second lubricant circuit.

The turbine engine assembly may also include a first lubricant source and a second lubricant source. The first lubricant source may be fluidly coupled with the first lubricant circuit. The second lubricant source may be fluidly coupled with the second lubricant circuit.

The turbine engine apparatus may also include a gearbox for the electric machine. The first lubricant circuit may also be configured to provide the lubricant to the gearbox.

The turbine engine assembly may also include a gearbox for the electric machine. The second lubricant circuit may also be configured to provide the lubricant to the gearbox.

The first rotating structure may be configured as or otherwise include a turbine engine shaft coupled to the rotating coupler by the first connection.

The first rotating structure may also include a bladed rotor connected to the turbine engine shaft.

The first rotating structure may be configured as or otherwise include a gear in a gearbox for the electric machine.

The second rotating structure may be configured as or otherwise include a gear in a gearbox for the electric machine.

The second rotating structure may be configured as or otherwise include an electric machine shaft. The electric machine rotor may be mounted to the electric machine shaft.

The second rotating structure may be configured as or otherwise include the electric machine rotor.

The rotating coupler may be configured as or otherwise include a flexible coupling disposed axially between the first connection and the second connection.

The turbine engine assembly may also include a compressor section, a combustor section, a turbine section and a flowpath extending sequentially through the compressor section, the combustor section and the turbine section. The turbine engine apparatus may be radially inboard of the flowpath.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
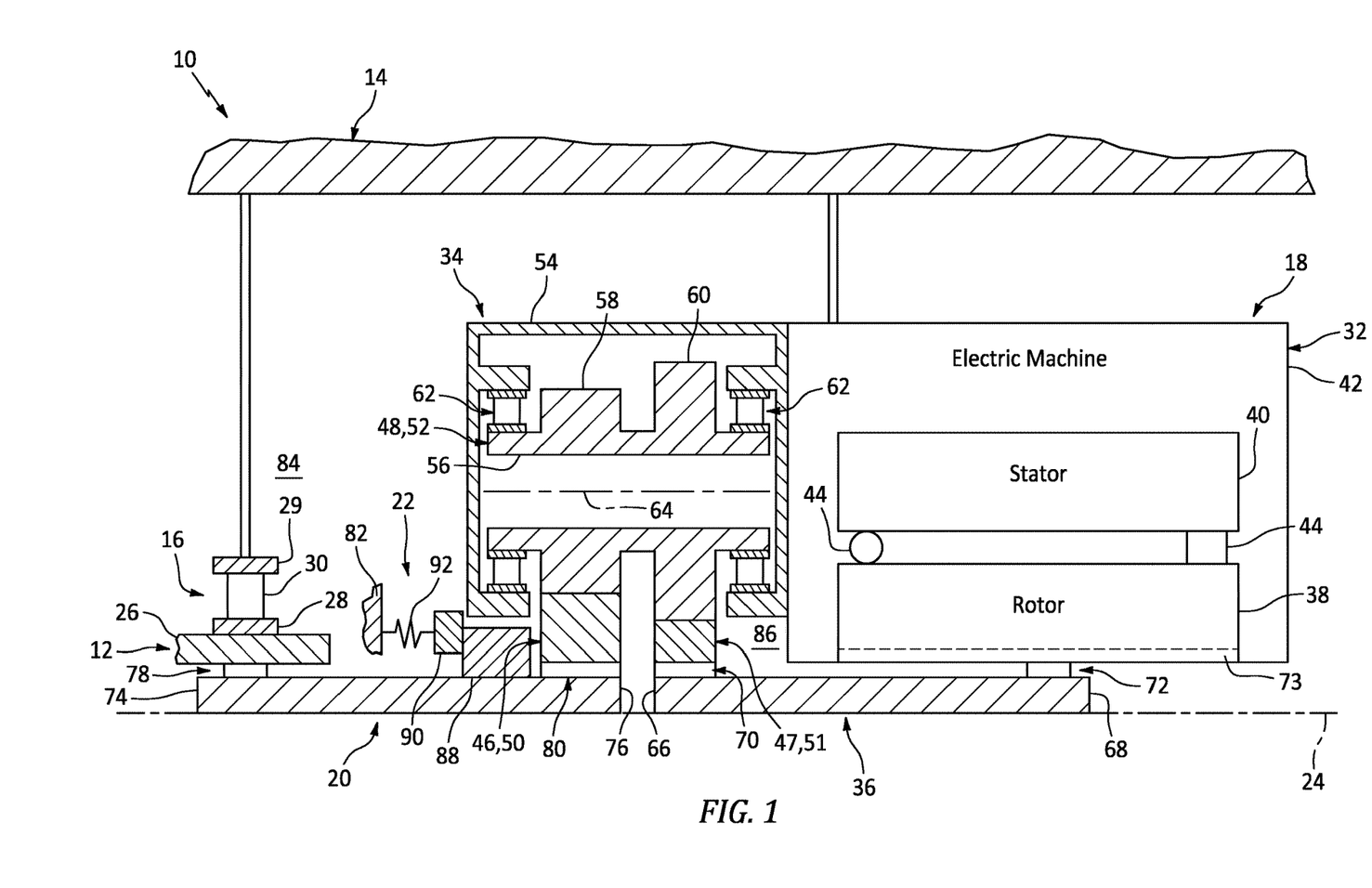
FIG. 1 is partial sectional illustration of an assembly for a turbine engine.

FIG. 1 illustrates an assembly 10 for a turbine engine. This turbine engine assembly 10 includes an engine (e.g., core) rotating structure 12, a stationary structure 14 and at least one engine rotating structure bearing 16 that rotatably mounts the engine rotating structure 12 to the stationary structure 14. The turbine engine assembly 10 also includes a turbine engine apparatus 18, a rotating shaft coupler 20 and a seal assembly 22.

The engine rotating structure 12 extends axially along a rotational axis 24 to a (e.g., aft, or forward) distal end of the rotating structure 12, which rotational axis 24 may be an axial centerline of the turbine engine assembly 10. The engine rotating structure 12 extends circumferentially around and is rotatable about the rotational axis 24. The engine rotating structure 12 may be configured as or otherwise include any rotatable component or assembly of rotatable components within the turbine engine. The engine rotating structure 12 of FIG. 1, for example, is configured as a turbine engine shaft 26. However, this engine rotating structure 12 may also include one or more additional elements such as, but not limited to, sleeves, spacers, rotors, seal elements, etc. Furthermore, while the turbine engine shaft 26 may be configured as a single monolithic body, the turbine engine shaft 26 may alternatively include a plurality of interconnected shafts/shaft segments.

The stationary structure 14 may be configured as or otherwise include any stationary (e.g., static, non-rotating) component or assembly of stationary components within the turbine engine. The stationary structure 14, for example, may include a turbine engine case and one or more internal support structures within and connected to the turbine engine case.

The structure bearing 16 may be configured as a rolling element bearing. The structure bearing 16 of FIG. 1, for example, includes a bearing inner race 28, a bearing outer race 29 and a plurality of bearing rolling elements 30. The inner race 28 is connected (e.g., fixedly mounted) to the engine rotating structure 12 and its turbine engine shaft 26. The outer race 29 is connected (e.g., fixedly mounted) to the stationary structure 14. The rolling elements 30 are arranged circumferentially about the rotational axis 24 in an array. The rolling elements 30 are disposed radially between and engaged with the inner race 28 and the outer race 29. With this arrangement, the structure bearing 16 is configured to rotatably mount the engine rotating structure 12 and its turbine engine shaft 26 to the stationary structure 14.

The turbine engine apparatus 18 may be configured as a removable and/or self-contained module. The turbine engine apparatus 18 of FIG. 1, for example, is configured for installation with and/or removal from the turbine engine and its turbine engine assembly 10 as a unitary module; e.g., a complete assembly. One or more components of this turbine engine apparatus 18, of course, may alternatively be assembled or disassembled discretely or as sub-assemblies where, for example, maintenance to the turbine engine apparatus 18 is performed while the turbine engine is on-wing.

The turbine engine apparatus 18 of FIG. 1 is configured as an electric machine system. This turbine engine apparatus 18, for example, includes an electric machine 32 and a gearbox 34. The turbine engine apparatus 18 also includes a rotating electric machine coupler 36.

The electric machine 32 is configurable as an electric motor and/or an electric generator. For example, during a motor mode of operation, the electric machine 32 may operate as the electric motor to convert electricity (e.g., received from a battery and/or another electricity source) into mechanical power; e.g., torque. This mechanical power may be utilized for various purposes within the turbine engine such as, for example, rotating the engine rotating structure 12 during turbine engine startup. During a generator mode of operation, the electric machine 32 may operate as the electric generator to convert mechanical power (e.g., received through the engine rotating structure 12) into electricity. This electricity may be utilized for various purposes within the turbine engine such as, for example, electrically powering one or more electric components of the turbine engine and/or charging the battery. The electricity may also or alternatively be utilized for various purposes outside of the turbine engine such as, for example, electrically powering one or more electrical components in an aircraft.

The electric machine 32 includes an (e.g., annular) electric machine rotor 38 and an (e.g., annular) electric machine stator 40. The electric machine 32 also includes an electric machine case 42 that at least partially or completely houses and/or supports the machine rotor 38 and/or the machine stator 40. The machine rotor 38 is configured to move relative to (e.g., rotate within or about) the machine stator 40 to convert electricity into mechanical power or convert mechanical power into electricity depending upon the mode of electric machine operation. The machine rotor 38, for example, may be rotatably mounted within the electric machine 32 to a stationary portion of the electric machine 32 (e.g., the machine case 42 and/or the machine stator 40) via one or more internal electric machine bearings 44; e.g., rolling element bearings. The machine stator 40 is connected (e.g., fixedly mounted) to the machine case 42, and the machine case 42 is connected (e.g., fixedly mounted) to the stationary structure 14.

Figure 1B:
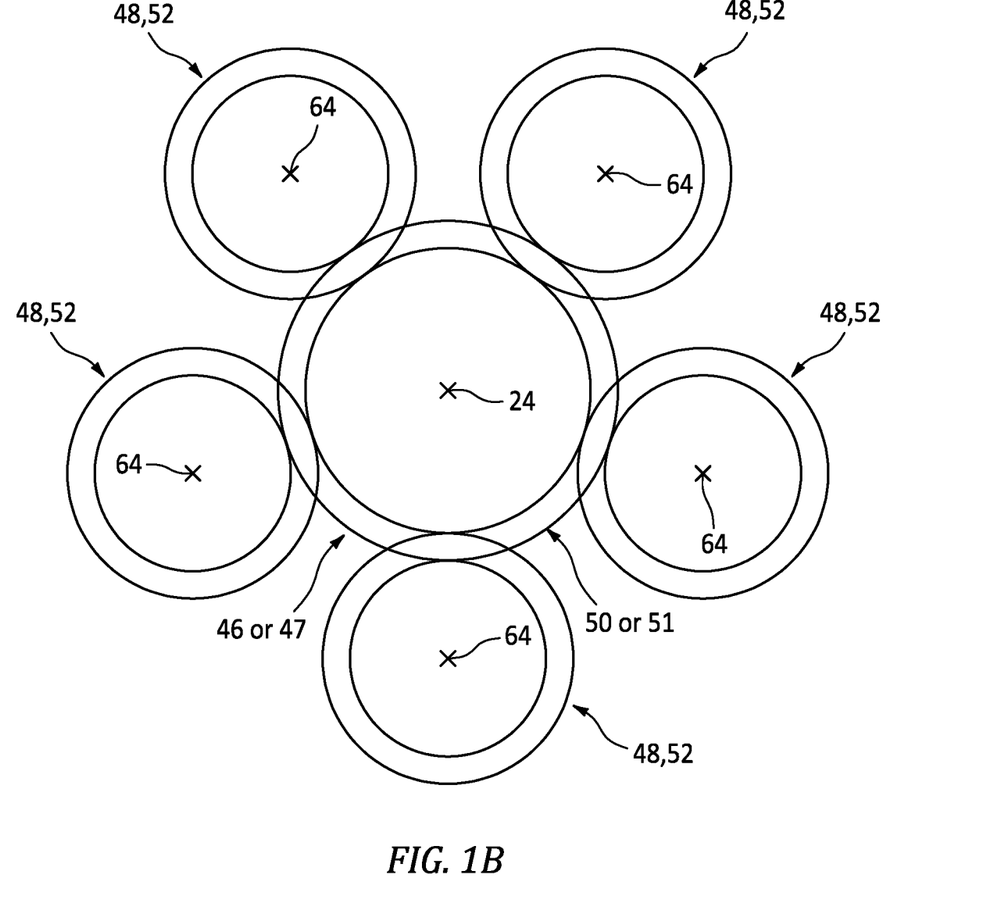
FIG. 1B is a schematic illustration of a gearbox.

The gearbox 34 of FIG. 1 includes a plurality of gearbox rotating structures 46-48. The first gearbox rotating structure 46 is configured as or otherwise includes a gearbox first gear 50; e.g., a sun gear. The second gearbox rotating structure 47 is configured as or otherwise includes a gearbox second gear 51; e.g., a sun gear. Each third gearbox rotating structure 48 is configured as or otherwise includes a gearbox idler 52 (e.g., a star gear-shaft), where the one or more third gearbox rotating structures 48/the one or more gearbox idlers 52 of FIG. 1B are distributed circumferentially about the rotational axis 24 in an array. The gearbox 34 of FIG. 1 also includes a gearbox case 54 that at least partially or completely houses and/or supports one or more of the gearbox rotating structures 46-48. This gearbox case 54 is connected to the stationary structure 14, for example, through the electric machine 32 and its machine case 42.

The gearbox first gear 50 and the gearbox second gear 51 are rotatable about the rotational axis 24. The gearbox first gear 50 is axially spaced from the gearbox second gear 51 along the rotational axis 24.

Each gearbox idler 52 of FIG. 1 includes an idler base 56 (e.g., a shaft), an idler first gear 58 (e.g., a star gear) and an idler second gear 60 (e.g., a star gear). Each gearbox idler 52 and its idler base 56 are rotatably mounted to the gearbox case 54 by one or more internal gearbox bearings 62; e.g., rolling element bearings. Each gearbox idler 52 and its idler base 56 of FIG. 1 are rotatable about an idler rotational axis 64 of the gearbox idler 52, which idler rotational axis 64 is parallel with and radially offset from the rotational axis 24. The idler first gear 58 and the idler second gear 60 are connected to the idler base 56. The idler first gear 58 is axially spaced from the idler second gear 60 along the idler rotational axis 64.

The idler first gear 58 is mated with the gearbox first gear 50. More particularly, exterior gear teeth of the idler first gear 58 are meshed with exterior gear teeth of the gearbox first gear 50. Similarly, the idler second gear 60 is mated with the gearbox second gear 51. More particularly, exterior gear teeth of the idler second gear 60 are meshed with exterior gear teeth of the gearbox second gear 51. The gearbox idler 52 (e.g., gear-shaft) thereby couples and transmits torque between the gearbox first gear 50 and the gearbox second gear 51.

The gearbox 34 of FIG. 1 is configured as a speed change device between the engine rotating structure 12 and the electric machine 32 and its machine rotor 38. For example, the gearbox first gear 50 is configured with an outer diameter that is different (e.g., greater) than an outer diameter of the gearbox second gear 51. The idler first gear 58 is also (or alternatively) configured with an outer diameter that is different (e.g., less) than an outer diameter of the idler second gear 60. With this arrangement, the gearbox 34 of FIG. 1 may be configured as a speed change device. The gearbox 34 of FIG. 1, for example, may be configured as a speed reduction device when, for example, the electric machine 32 and its machine rotor 38 drive the engine rotating structure 12. However, in other embodiments, the gearbox rotating structures 46-48 and their elements 50-52 may alternatively be configured such that the gearbox 34 is a speed reduction device as the engine rotating structure 12 drives the electric machine 32 and its machine rotor 38.

The machine coupler 36 extends axially along the rotational axis 24 between and to a first end 66 of the machine coupler 36 and a second end 68 of the machine coupler 36. The machine coupler 36 is rotatable about the rotational axis 24. The machine coupler 36 is coupled to the second gearbox rotating structure 47 and its gearbox second gear 51 by a coupler-gearbox connection 70; e.g., a spline connection. Exterior splines of the machine coupler 36 at (e.g., on, adjacent or proximate) the machine coupler first end 66, for example, may be meshed with interior splines of the second gearbox rotating structure 47 and its gearbox second gear 51. Similarly, the machine coupler 36 is coupled to the machine rotor 38 by a coupler-electric machine connection 72; e.g., a spline connection. Exterior splines of the machine coupler 36 at the machine coupler second end 68, for example, may be meshed with interior splines of the machine rotor 38. The machine coupler 36 thereby couples and may transmit mechanical power (e.g., torque) between the gearbox 34 and the electric machine 32 and, more particularly, between the gearbox second gear 51 and the machine rotor 38. In other embodiments, an intermediate rotating structure 73 (e.g., an internal electric machine shaft) may be included and arranged between the machine coupler 36 and the machine rotor 38; e.g., the connection 72 may be between the machine coupler 36 and the intermediate rotating structure 73.

The shaft coupler 20 extends axially along the rotational axis 24 between and to a first end 74 of the shaft coupler 20 and a second end 76 of the shaft coupler 20. The shaft coupler 20 is rotatable about the rotational axis 24. The shaft coupler 20 is coupled to the engine rotating structure 12 and its turbine engine shaft 26 by a coupler-shaft connection 78; e.g., a spline connection. Exterior splines of the shaft coupler 20 at the shaft coupler first end 74, for example, may be meshed with interior splines of the engine rotating structure 12 and its turbine engine shaft 26. Similarly, the shaft coupler 20 is coupled to the first gearbox rotating structure 46 and its gearbox first gear 50 by a coupler-gearbox connection 80; e.g., a spline connection. Exterior splines of the shaft coupler 20 at (e.g., on, adjacent or proximate) the shaft coupler second end 76, for example, may be meshed with interior splines of the first gearbox rotating structure 46 and its gearbox first gear 50. The shaft coupler 20 thereby couples and may transmit mechanical power (e.g., torque) between the engine rotating structure 12 and the gearbox 34 and, more particularly, between the turbine engine shaft 26 and the gearbox first gear 50.

The seal assembly 22 is configured to seal an annular gap between the engine rotating structure 12 and a stationary component 82, which stationary component 82 may be part of the stationary structure 14 or another component or structure connected to the stationary structure 14 such as, for example, the gearbox case 54. The seal assembly 22 may thereby fluidly separate a first compartment 84 within the turbine engine from a second compartment 86 within the turbine engine. The first compartment 84 of FIG. 1 may be a bearing compartment in which at least the structure bearing 16 is arranged. The second compartment 86 of FIG. 1 may be a turbine engine apparatus (e.g., a gearbox and/or electric machine) compartment in which at least one or more elements of the gearbox 34 and/or one or more elements of the electric machine 32 are arranged. Arranging the seal assembly 22 between the gearbox 34 and the engine rotating structure 12 and its turbine engine shaft 26 may facilitate configuring the electric machine 32 and the gearbox 34 as a removable module. This seal assembly arrangement may also or alternatively facilitate provision of multi-circuit lubrication as described below; e.g., the seal assembly 22 may fluidly separate volumes in different circuits.

The seal assembly 22 of FIG. 1 includes an annular, rotating seal land 88 and an annular, stationary seal element 90; e.g., a carbon seal element. The seal land 88 of FIG. 1 is connected to (e.g., mounted on) the shaft coupler 20. This seal land 88 is arranged axially along the rotational axis 24 between the coupler-shaft connection 78 and the coupler-gearbox connection 80, and may be disposed adjacent or proximate the coupler-gearbox connection 80. The seal element 90 is connected (e.g., spring mounted) to the stationary component 82 (e.g., the stationary structure 14 or the gearbox case 54), for example, through a biasing device 92; e.g., a spring element. This biasing device 92 is configured to bias (e.g., push) the seal element 90 (e.g., axially, or alternatively radially) against the seal land 88 to maintain sealing engagement between the seal land 88 and the seal element 90.

Figure 2:
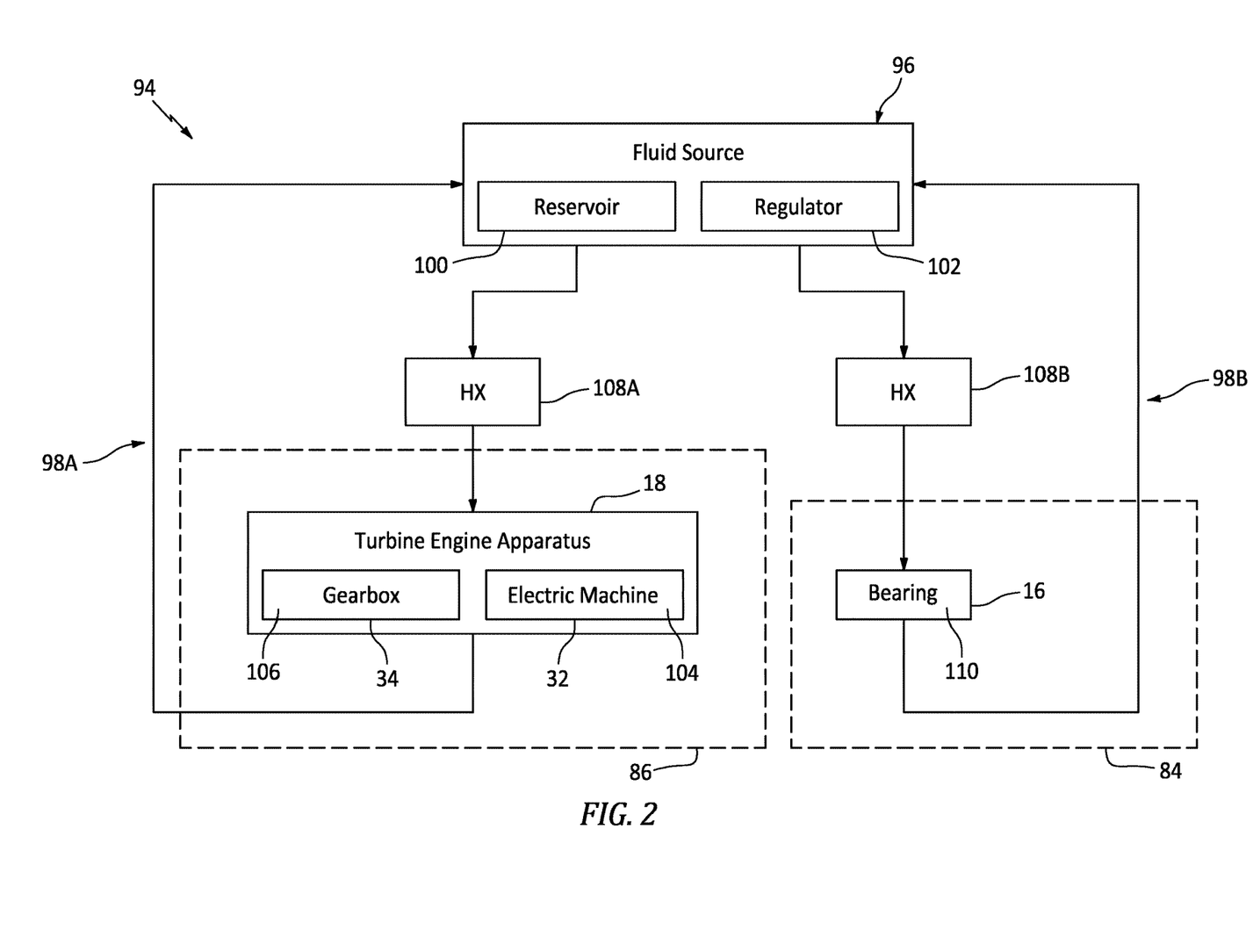
FIG. 2 is a schematic illustration of a lubrication system for the turbine engine assembly of FIG. 1.

Various components of the turbine engine assembly 10 may utilize lubricant (e.g., oil or another liquid) during turbine engine operation. This lubricant may lubricate the turbine engine assembly components and/or cool the turbine engine assembly components. FIG. 2 schematically illustrates a lubrication system 94 for providing the lubricant to the turbine engine assembly 10 of FIG. 1. This lubrication system 94 includes a lubricant source 96 and a plurality of lubricant circuits 98A and 98B (generally referred to as "98").

The lubricant source 96 is configured to provide the lubricant to the lubricant circuits 98 during lubrication system operation. The lubricant source 96 may also be configured to store (e.g., contain a quantity of) the lubricant before, during and/or after lubrication system operation. The lubricant source 96 of FIG. 2, for example, includes a lubricant reservoir 100 and a lubricant flow regulator 102. The lubricant flow regulator 102 may be or otherwise include a pump and/or a valve. This lubricant flow regulator 102 is configured to direct the lubricant received from the lubricant reservoir 100 to the lubricant circuits 98.

The lubricant circuits 98 may be arranged fluidly in parallel with one another and/or otherwise fluidly independent from one another. The lubricant source 96 of FIG. 2, for example, is fluidly coupled in parallel with the first lubricant circuit 98A and the second lubricant circuit 98B. The first lubricant circuit 98A may thereby be fluidly independent of the second lubricant circuit 98B. More particularly, the lubricant received by the first lubricant circuit 98A may be received from the lubricant source 96 and its flow regulator 102 (e.g., as a supply) and/or provided to the lubricant source 96 and its reservoir 100 (e.g., as a return) independent of (e.g., not through, not by way of) the second lubricant circuit 98B. Similarly, the second lubricant circuit 98B may be fluidly independent of the first lubricant circuit 98A. More particularly, the lubricant received by the second lubricant circuit 98B may be received from the lubricant source 96 and its flow regulator 102 (e.g., as a supply) and/or provided to the lubricant source 96 and its reservoir 100 (e.g., as a return) independent of the first lubricant circuit 98A.

The first lubricant circuit 98A includes one or more internal volumes 104 and 106 for one or more respective components 32 and 34 of the turbine engine. Each of these internal volumes 104, 106 may be or otherwise include an internal cavity, an internal passage and/or another space within and/or at least partially or completely formed by a respective turbine engine component, which internal volume is adapted to receive and flow the lubricant. The machine volume 104, for example, may be configured as or otherwise include a passage within the electric machine 32. The machine volume 104 may also or alternatively be configured as or otherwise include a cavity within the electric machine 32 in which one or more of the machine elements 38 and 40 (see FIG. 1) are disposed. The gearbox volume 106 may be configured as or otherwise include a cavity within the gearbox 34 in which one or more of the gearbox elements 46-48 (see FIG. 1) are disposed. The machine volume 104 may be arranged fluidly in parallel with the gearbox volume 106. Alternatively, the internal volumes 104 and 106 may be arranged fluidly in serial, for example, where the machine volume 104 is upstream of the gearbox volume 106.

The first lubricant circuit 98A is configured to direct the lubricant to one or more of the internal volumes 104 and 106 at or about (e.g., within one to five degrees Celsius of) a first circuit temperature, for example, during normal turbine engine operation. The first lubricant circuit 98A, for example, includes a first circuit heat exchanger 108A configured to cool or heat the lubricant provided to the turbine engine apparatus 18 (e.g., the electric machine 32 and/or the gearbox 34) to or about the first circuit temperature. This first circuit temperature may be selected (e.g., optimized) for operation of the turbine engine apparatus 18 and one or more of its components 32 and/or 34. For example, the first circuit temperature may be relatively cool to reduce or prevent heat related degradation of material(s) such as resin, etc. within the electric machine 32 and its windings. However, as the lubricant flows through the electric machine 32, the lubricant may be heated to an elevated second temperature that is greater than the first circuit temperature, for example, during normal turbine engine operation. The gearbox 34 may thereby receive the lubricant at or about the second temperature, where the first lubricant circuit 98A may be configured such that the second temperature is selected (e.g., optimized) for operation of the gearbox 34. The second temperature, for example, may be five degrees Celsius (5° C.), ten degrees Celsius (10° C.), twenty degrees Celsius (20° C.) or more than the first circuit temperature. The present disclosure, however, is not limited to such an exemplary lubricant temperature relationship.

The second lubricant circuit 98B includes at least one internal bearing volume 110 for at least one the structure bearing 16. This bearing volume 110 may be or otherwise include an internal cavity, an internal passage and/or another space within and/or at least partially or completely formed by a respective turbine engine component, which internal volume is adapted to receive and flow the lubricant. The bearing volume 110, for example, may be configured as or otherwise include a passage within and/or a space at least partially formed by the structure bearing 16.

The second lubricant circuit 98B is configured to direct the lubricant to the bearing volume 110 at or about a second circuit temperature, for example, during normal turbine engine operation. The second lubricant circuit 98B, for example, includes a second circuit heat exchanger 108B configured to cool or heat the lubricant provided to the bearing volume 110 to or about the second circuit temperature. This second circuit temperature may be selected (e.g., optimized) for operation of the structure bearing 16. For example, the second circuit temperature may be relatively warm. The second circuit temperature, for example, may be thirty to sixty degrees Celsius (30-60° C.) greater than the first circuit temperature; e.g., between forty to fifty degrees Celsius (40-50° C.) greater than the first circuit temperature. The present disclosure, however, is not limited to such an exemplary lubricant temperature relationship.

Figure 3:
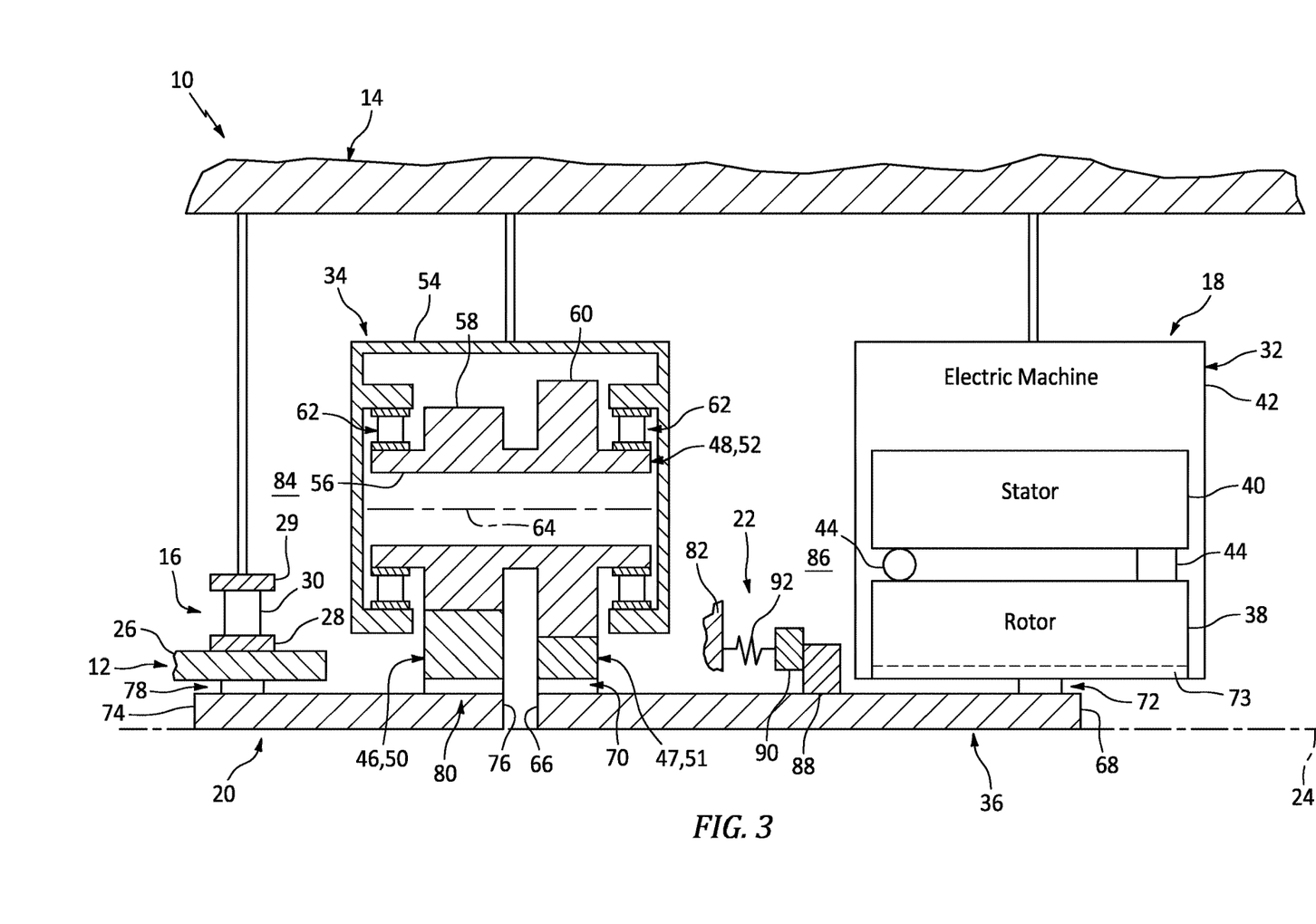
FIG. 3 is a partial sectional illustration of the turbine engine assembly with another seal assembly configuration.

In some embodiments, referring to FIG. 3, the gearbox 34 may be configured discrete/separate from (e.g., outside of) the turbine engine apparatus 18; e.g., module. The gearbox 34 and its gearbox case 54 may also be connected to the stationary structure 14 independent of the electric machine 32 and its machine case 42. In such embodiments, the seal land 88 may be connected to (e.g., mounted on) the machine coupler 36 rather than the shaft coupler 20 as shown in FIG. 1. This seal land 88 of FIG. 3 is arranged axially along the rotational axis 24 between the coupler-gearbox connection 70 and the coupler-electric machine connection 72. Here, the stationary component 82 may be configured as the stationary structure 14, the gearbox case 54 or the machine case 42.

With the foregoing arrangement, the first compartment 84 of FIG. 3 may be a compartment in which at least the structure bearing 16 and/or one or more of the gearbox elements 46-48 and/or 54 are arranged. The second compartment 86 of FIG. 3 may be a turbine engine apparatus (e.g., an electric machine) compartment in which at least one or more elements 38, 40 and/or 42 of the electric machine 32 are arranged. Arranging the seal assembly 22 between the electric machine 32 and the gearbox 34 may facilitate configuring the electric machine 32 as a removable module. This seal assembly arrangement may also or alternatively facilitate provision of multi-circuit lubrication as described below; e.g., the seal assembly 22 may fluidly separate volumes in different circuits.

Figure 4:
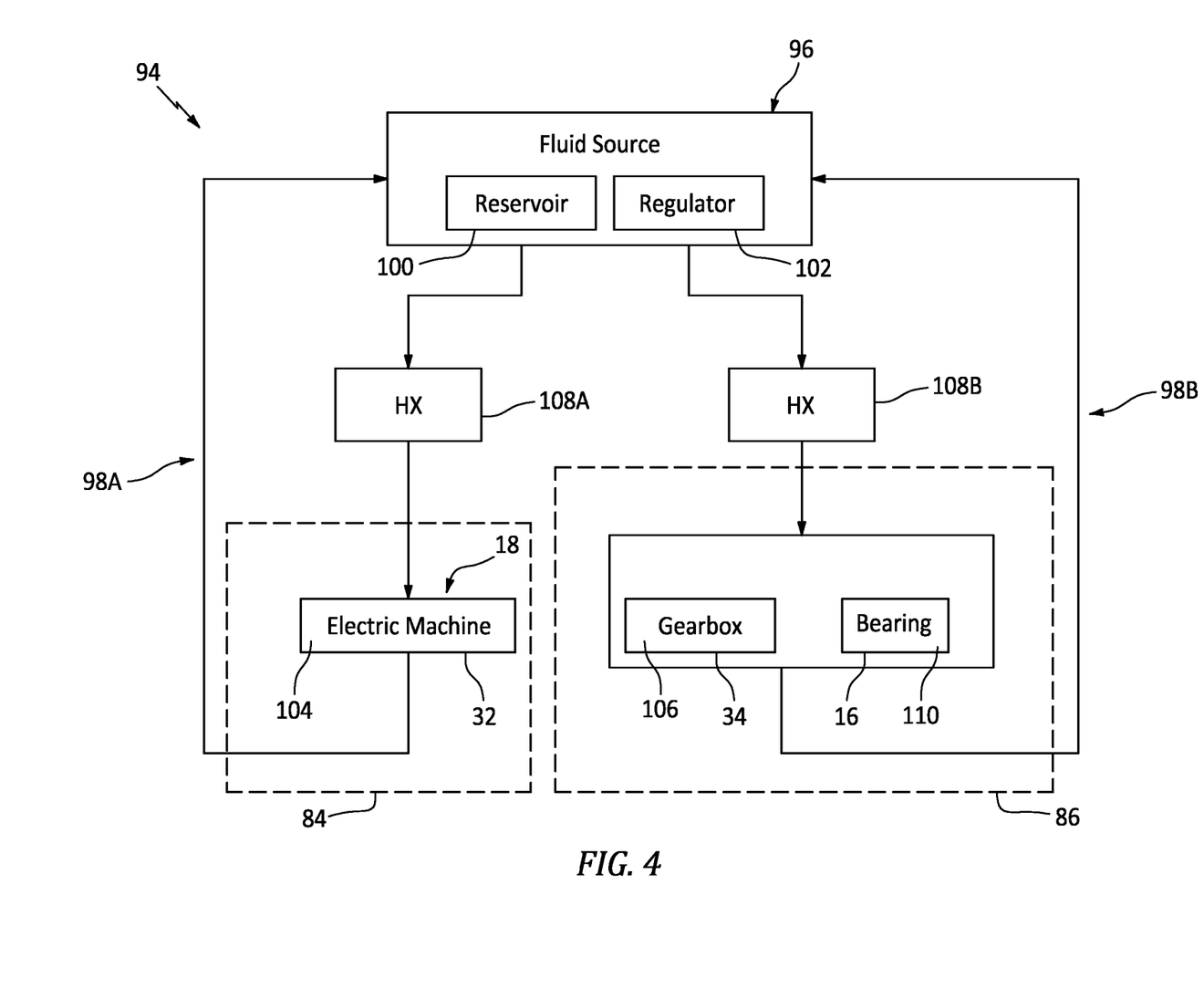
FIG. 4 is a schematic illustration of the lubrication system for the turbine engine assembly of FIG. 3.

FIG. 4 schematically illustrates the lubrication system 94 for providing the lubricant to the turbine engine assembly 10 of FIG. 3. This lubrication system 94 includes the lubricant source 96 and the lubricant circuits 98. However, in contrast to the embodiment of FIG. 2, the gearbox volume 106 is omitted from the first lubricant circuit 98A and included with the second lubricant circuit 98B. Thus, the first lubricant circuit 98A of FIG. 4 services the turbine engine apparatus 18 and its electric machine 32 of FIG. 3, and the second lubricant circuit 98B of FIG. 4 services the structure bearing 16 and the gearbox 34.

Within the second lubricant circuit 98B of FIG. 4, the bearing volume 110 may be arranged fluidly in parallel with the gearbox volume 106. Alternatively, the internal volumes 106 and 110 may be arranged fluidly in serial, for example, where the bearing volume 110 is upstream of the gearbox volume 106, or vice versa.

Figure 5:
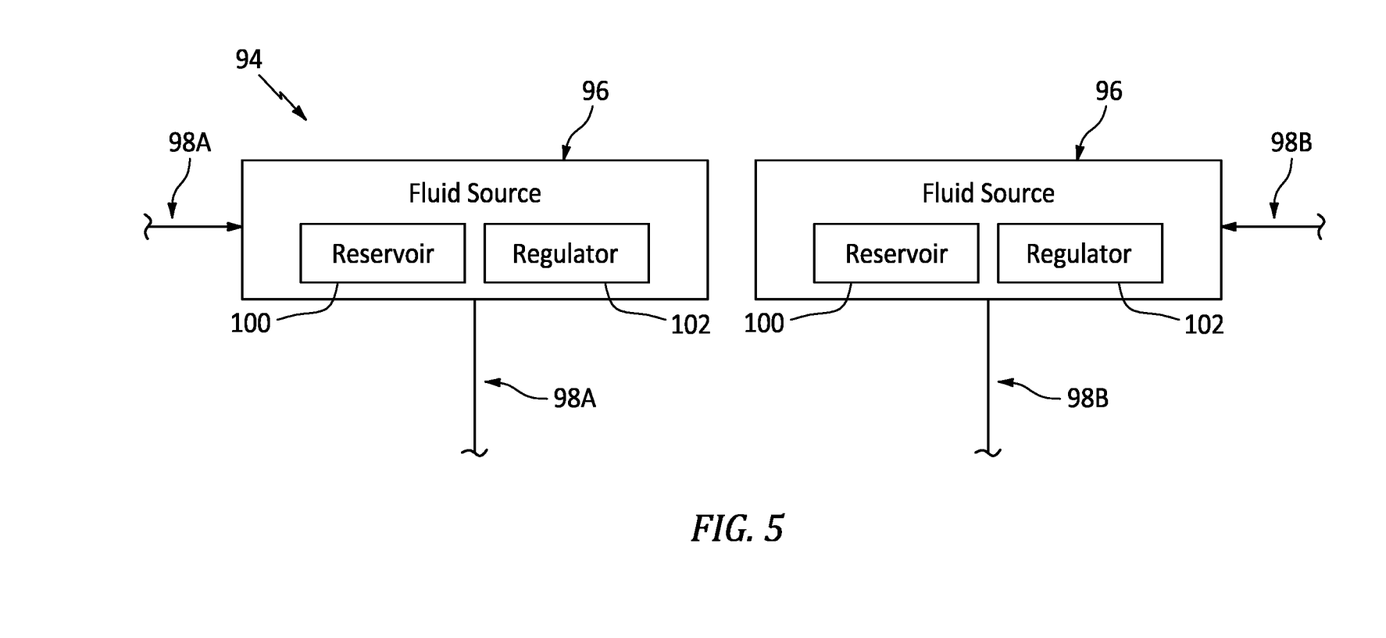
FIG. 5 is a schematic illustration of a portion of the lubrication system configured with independent fluid sources.
Figure 6A:
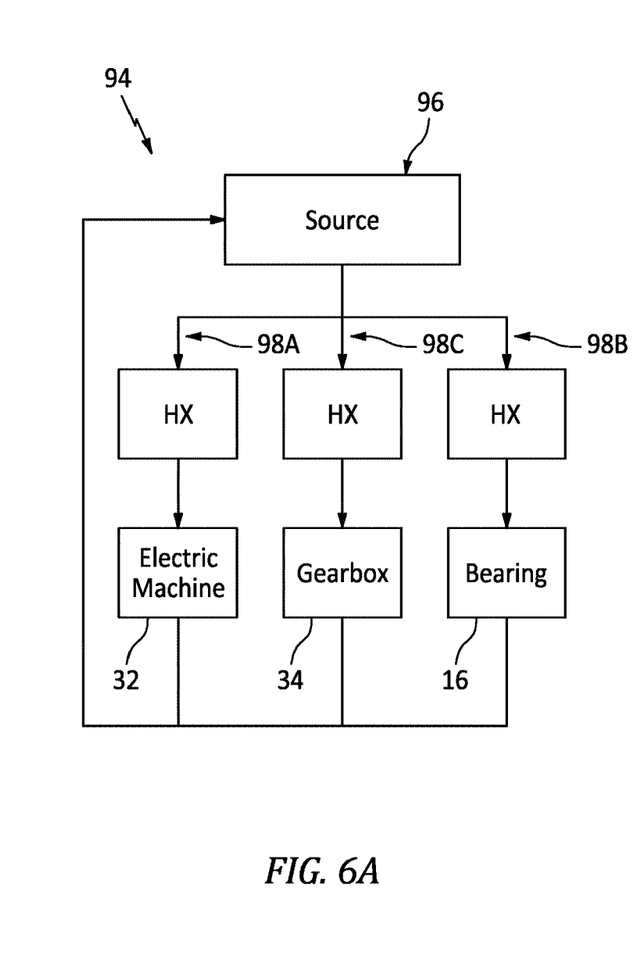
FIGS. 6A and 6B are schematic illustrations of the lubrication system configured with various fluid circuit arrangements.
Figure 6B:
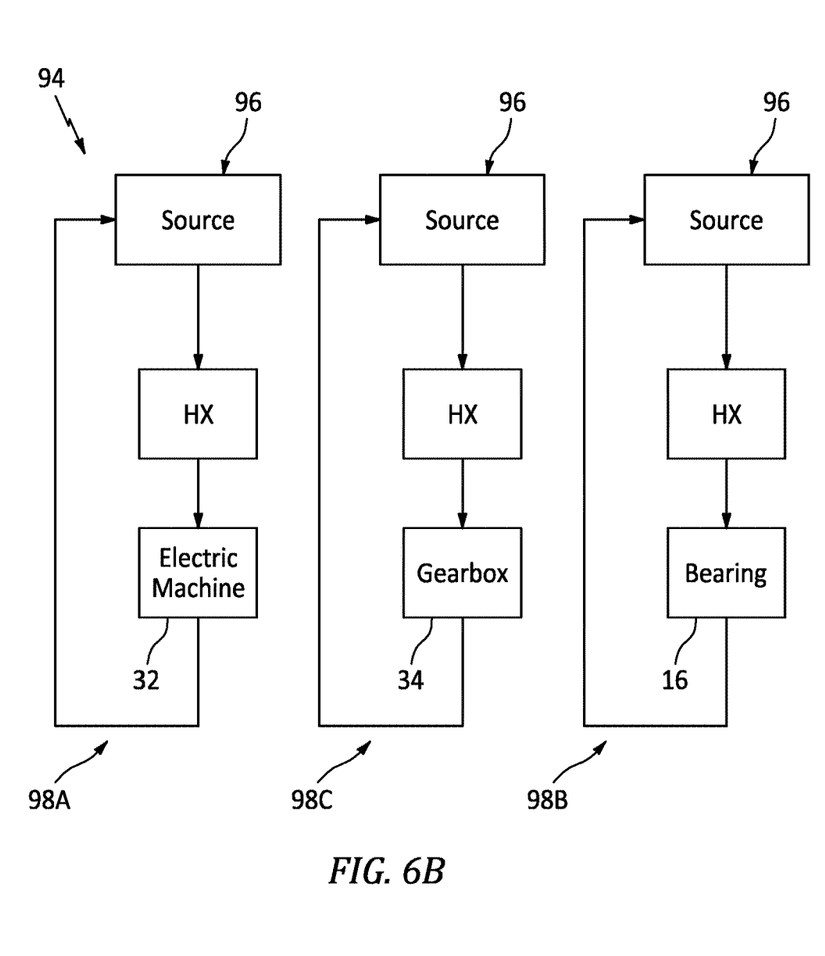

The lubrication systems 94 of FIGS. 2 and 4 are described above as providing the lubricant to certain exemplary components. Of course, in other embodiments, one or more of the lubricant circuits 98 may also or alternatively include one or more additional fluid components other than those described above. Examples of these other fluid circuit components may include, but are not limited to, heat exchanger(s), sensor(s), manifold(s), additional bearing(s), a gear train, nozzle(s), etc. Furthermore, referring to FIG. 5, each of the lubricant circuits 98 may alternatively be configured with a dedicated (e.g., separate) lubricant source 96. With such a configuration, the first lubricant circuit 98A may be (e.g., completely) fluidly discrete/separate from the second lubricant circuit 98B. In addition or alternatively, while the first lubricant circuit 98A of FIG. 2 services both the gearbox 34 and the electric machine 32, the gearbox 34 of FIGS. 6A and 6B may alternatively be configured with its own dedicated lubricant circuit 98C. Referring to FIG. 6A, the gearbox lubricant circuit 98C may be fluidly coupled with the lubricant source 96 in parallel with the electric machine lubricant circuit 98A and/or the bearing lubricant circuit 98B. Alternatively, referring to FIG. 6B, the gearbox lubricant circuit 98C may be fluidly discrete/separate from the electric machine lubricant circuit 98A and/or the bearing lubricant circuit 98B.

Figure 7:
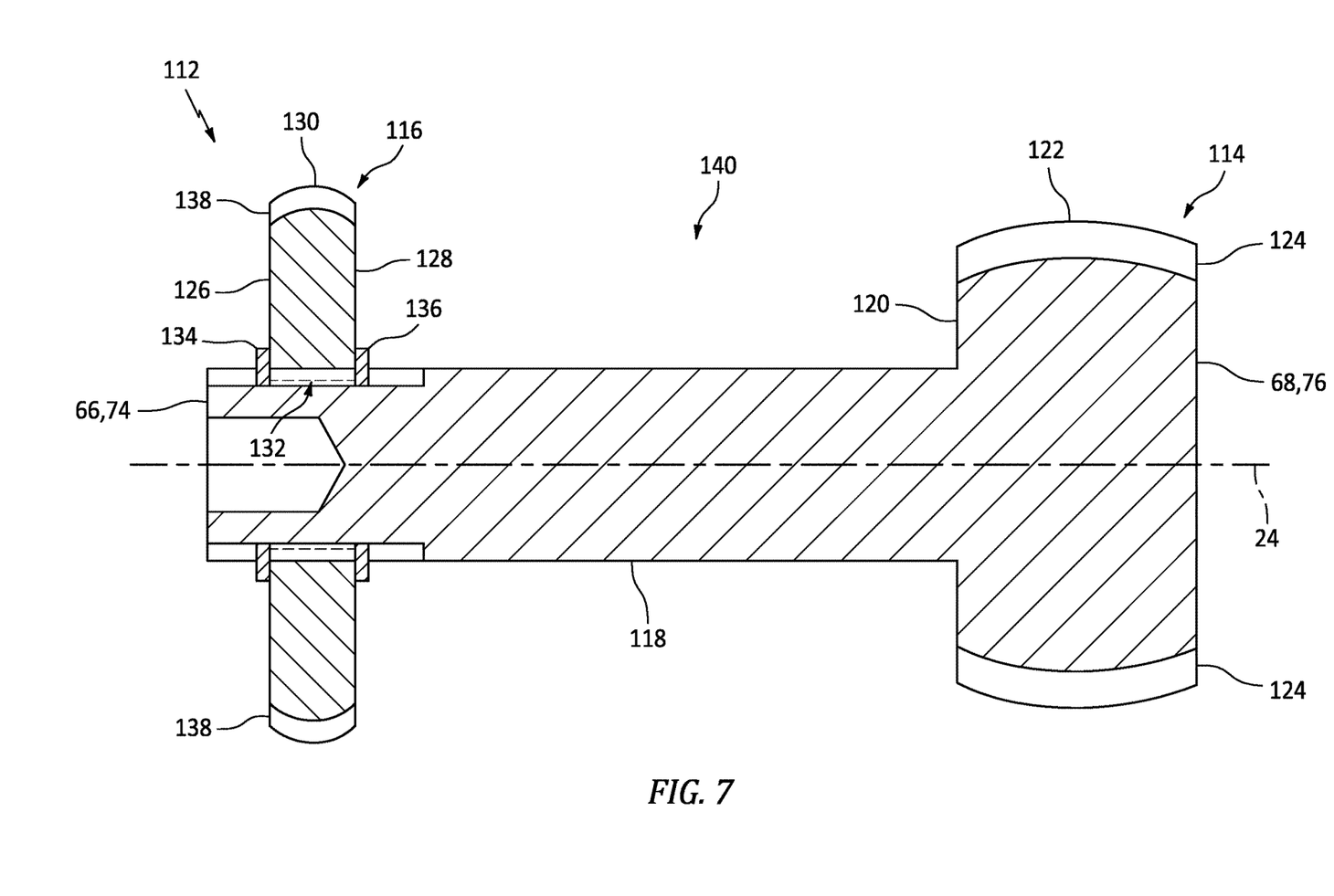
FIG. 7 is a sectional illustration of a double spline coupler.

In some embodiments, referring to FIG. 7, one or each of the couplers 20 and/or 36 of FIGS. 1 and 3 may be configured as a double spline coupler 112; e.g., a double articulation quill shaft. This double spline coupler 112 may be configured with a dumbbell configuration. The double spline coupler 112 of FIG. 7, for example, includes a splined shaft 114 and a splined element 116 attached (e.g., removably mounted) to the splined shaft 114.

The splined shaft 114 of FIG. 7 includes a shaft base 118 and a shaft rim 120; e.g., an annular flange. The shaft base 118 extends axially along the rotational axis 24 between and to the coupler first end 66, 74 and the coupler second end 68, 76. The shaft rim 120 is connected to the shaft base 118 and disposed at the coupler second end 68, 76; of course, in other embodiments these ends may be reversed such that the shaft rim 120 is disposed at the coupler first end 66, 74. The shaft rim 120 projects radially out from the shaft base 118 to an outer periphery 122 of the shaft rim 120. The shaft rim 120 includes/forms the coupler splines 124; e.g., crowned splines. These coupler splines 124 are arranged circumferentially about the shaft rim 120/the rotational axis 24 at the rim outer periphery 122. The coupler splines 124 of FIG. 7 thereby form the rim outer periphery 122 of the shaft rim 120.

The splined element 116 may be configured as an annular body. The splined element 116 of FIG. 7, for example, extends axially along the rotational axis 24 between and to opposing sides 126 and 128 of the splined element 116. The splined element 116 extends radially between and to an inner periphery of the splined element 116 and an outer periphery 130 of the splined element 116. The splined element 116 extends circumferentially about (e.g., completely around) the rotational axis 24.

The shaft base 118 of FIG. 7 projects axially through (or into) a bore of the splined element 116. This splined element 116 may be rotationally fixed to the splined shaft 114 by a spline connection 132; e.g., a straight-spline connection. The splined element 116 may be axially fixed to the splined shaft 114 by, for example, one or more retainers 134 and 136; e.g., split rings. Each retainer 134, 136, for example, is disposed within a respective receptacle (e.g., groove, notch, etc.) in the shaft base 118 axially adjacent a respective side 126, 128 of the splined element 116.

When attached to the splined shaft 114 and its shaft base 118, the splined element 116 projects radially out from the shaft base 118 to its element outer periphery 130. The splined element 116 includes/forms the coupler splines 138; e.g., crowned splines. These coupler splines 138 are arranged circumferentially about the splined element 116/the rotational axis 24 at the element outer periphery 130. The coupler splines 138 of FIG. 7 thereby form the element outer periphery 130 of the splined element 116.

The splined element 116 of FIG. 7 is spaced axially from the shaft rim 120. The double spline coupler 112 is thereby configured with an annular channel 140. This annular channel 140 project radially into the double spline coupler 112 to the shaft base 118. The annular channel 140 extends axially along the rotational axis 24 within the double spline coupler 112 between and to the splined element 116 and the shaft rim 120. The annular channel 140 extends circumferentially about (e.g., completely around) the rotational axis 24 through the double spline coupler 112.

Figure 8:
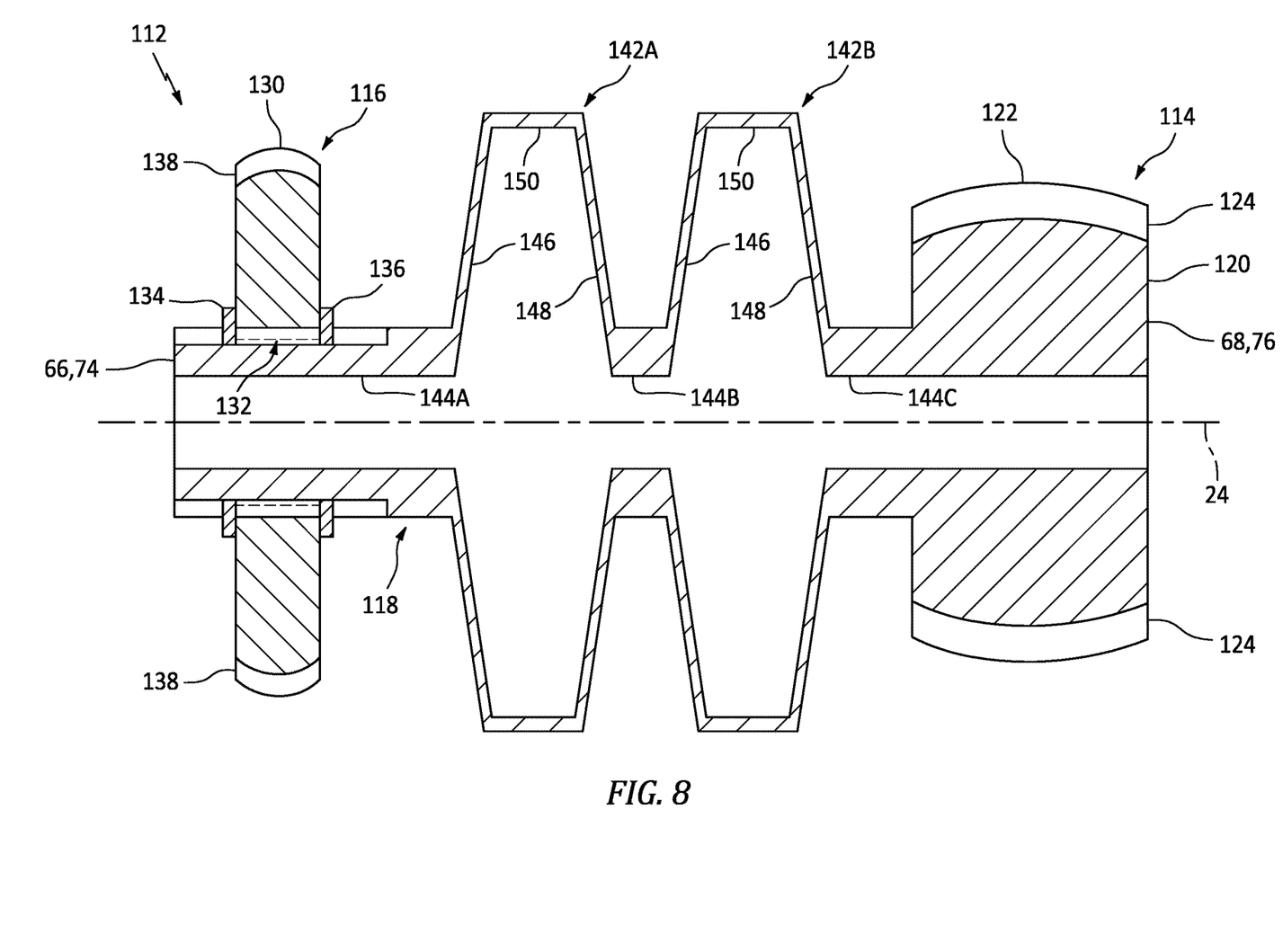
FIG. 8 is a sectional illustration of the double spline coupler configured with one or more flexible couplings.

In some embodiments, referring to FIG. 8, the double spline coupler 112 may be configured with one or more flexible couplings 142A and 142B (generally referred to as "142"); e.g., a flex mount. Each flexible coupling 142A, 142B of FIG. 8 is configured to provide a flexible connection between axially neighboring (e.g., adjacent) sections 144A and 144B, 144B and 144C of the shaft base 118. Each flexible coupling 142 of FIG. 8, for example, includes a first diaphragm 146, a second diaphragm 148 and a bridge 150. The first diaphragm 146 is connected to a respective one of the base sections 144A, 144B and the bridge 150. This first diaphragm 146 extends radially outward (or inward) from the respective base section 144A, 144B to the bridge 150. The second diaphragm 148 is connected to a respective one of the base sections 144B, 114C and the bridge 150. This second diaphragm 148 extends radially outward (or inward) from the respective base section 144B, 144C to the bridge 150. The bridge 150 extends axially along the rotational axis 24 between and to the first diaphragm 146 and the second diaphragm 148. With this arrangement, the first diaphragm 146 and/or the second diaphragm 148 may facilitate slight axial shifts and/or slight pivoting between the respective base sections 144A and 144B, 144B and 144C.

Figure 9:
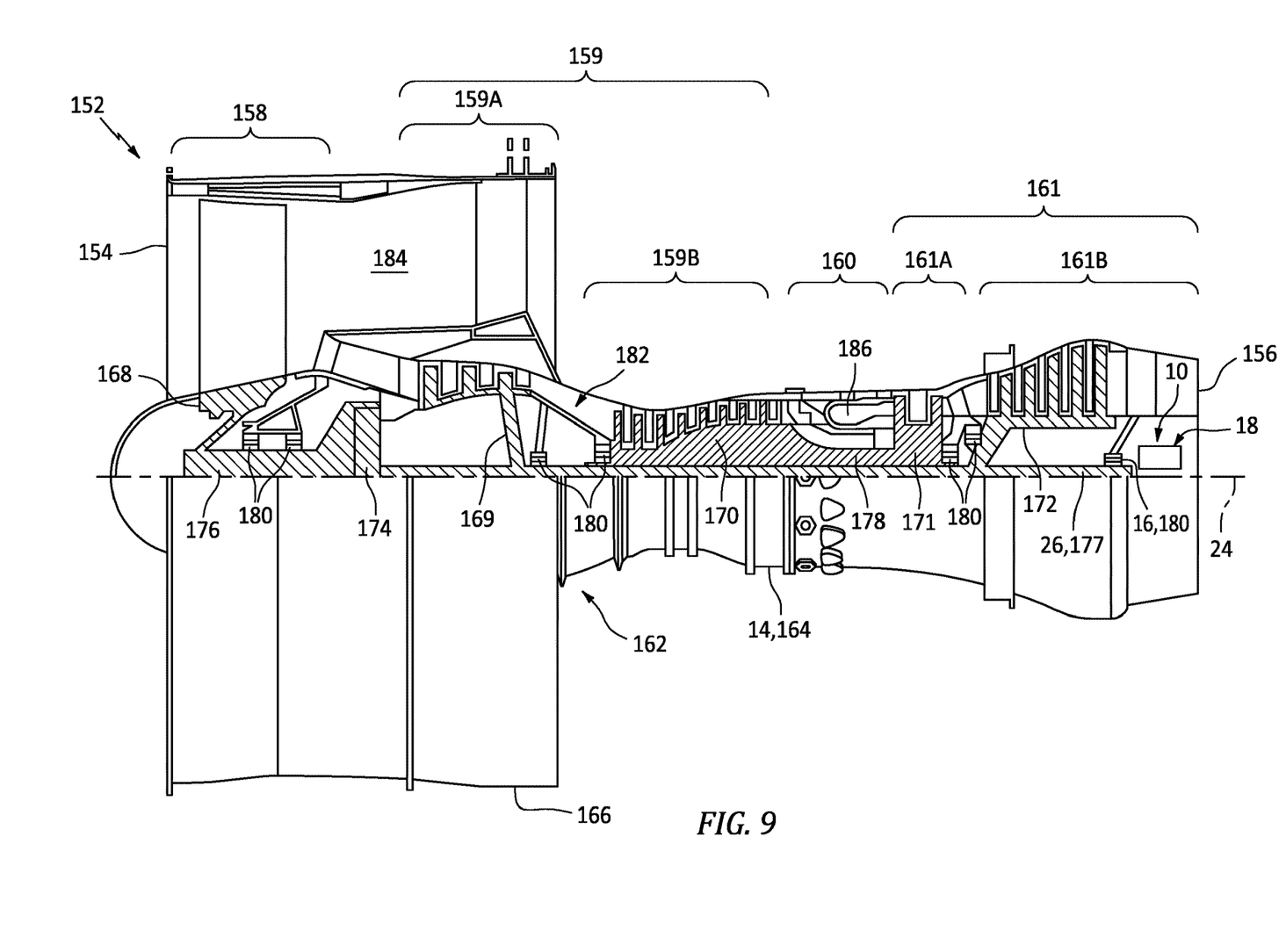
FIG. 9 is a side cutaway illustration of a geared turbofan gas turbine engine.

FIG. 9 illustrates an example of the turbine engine with which the turbine engine assembly 10 may be configured. This turbine engine is configured as a geared, turbofan gas turbine engine 152. This turbine engine 152 extends along the rotational axis 24 between an upstream airflow inlet 154 and a downstream airflow exhaust 156. The turbine engine 152 includes a fan section 158, a compressor section 159, a combustor section 160 and a turbine section 161. The compressor section 159 includes a low pressure compressor (LPC) section 159A and a high pressure compressor (HPC) section 159B. The turbine section 161 includes a high pressure turbine (HPT) section 161A and a low pressure turbine (LPT) section 161B.

The engine sections 158-161B are arranged sequentially along the rotational axis 24 within an engine housing 162. This engine housing 162 includes an inner case 164 (e.g., a core case) and an outer case 166 (e.g., a fan case). The inner case 164 may house one or more of the engine sections 159A-161B (e.g., an engine core) as well as the turbine engine apparatus 18. The outer case 166 may house at least the fan section 158.

Each of the engine sections 158, 159A, 159B, 161A and 161B includes a respective bladed rotor 168-172. Each of these bladed rotors 168-172 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 168 is connected to a gear train 174, for example, through a fan shaft 176. The gear train 174 and the LPC rotor 169 are connected to and driven by the LPT rotor 172 through a low speed shaft 177. The HPC rotor 170 is connected to and driven by the HPT rotor 171 through a high speed shaft 178. The shafts 176-178 are rotatably supported by a plurality of bearings 180; e.g., rolling element bearings. Each of these bearings 180 is connected to the engine housing 162 by, for example, an annular support strut.

During operation, air enters the turbine engine 152 through the airflow inlet 154. This air is directed through the fan section 158 and into a core flowpath 182 and a bypass flowpath 184. The core flowpath 182 extends sequentially through the engine sections 159A-161B. The air within the core flowpath 182 may be referred to as "core air". The bypass flowpath 184 extends through a bypass duct, which bypasses the engine core. The air within the bypass flowpath 184 may be referred to as "bypass air".

The core air is compressed by the LPC rotor 169 and the HPC rotor 170 and directed into a combustion chamber 186 of a combustor in the combustor section 160. Fuel is injected into the combustion chamber 186 and mixed with the compressed core air to provide a fuel-air mixture. This fuel air mixture is ignited and combustion products thereof flow through and sequentially cause the HPT rotor 171 and the LPT rotor 172 to rotate. The rotation of the HPT rotor 171 and the LPT rotor 172 respectively drive rotation of the HPC rotor 170 and the LPC rotor 169 and, thus, compression of the air received from a core airflow inlet. The rotation of the LPT rotor 172 also drives rotation of the fan rotor 168, which propels bypass air through and out of the bypass flowpath 184. The propulsion of the bypass air may account for a majority of thrust generated by the turbine engine 152, e.g., more than seventy-five percent (75%) of engine thrust. The turbine engine of the present disclosure, however, is not limited to the foregoing exemplary thrust ratio.

The turbine engine assembly 10 may be configured at various different locations within the turbine engine 152. For example, the turbine engine assembly 10 and its turbine engine apparatus 18 may be housed within the engine housing 162 and, more particularly, the inner case 164. The stationary structure 14, for example, may be or otherwise include the inner case 164. The turbine engine apparatus 18 may also be disposed radially inboard of the core flowpath 182, where the core flowpath 182 axially overlaps and extends circumferentially about (e.g., completely around, circumscribes) the turbine engine apparatus 18. For example, the turbine engine apparatus 18 may be arranged with/axially aligned with the turbine section 161, where the turbine engine shaft 26 may be one of the shafts 176-178 (e.g., 177) and the structure bearing 16 may be a respective one of the bearings 180 supporting the respective shaft. The present disclosure, however, is not limited to such an exemplary arrangement. For example, in other embodiments, the turbine engine assembly 10 and its turbine engine apparatus 18 may also or alternatively be arranged with/aligned with another one or more sections 158, 159 and/or 160 of the turbine engine 152.

The turbine engine assembly 10 may be included in various turbine engines other than the one described above. The turbine engine assembly 10, for example, may be included in a geared turbine engine where a gear train connects one or more shafts to one or more rotors in a fan section, a compressor section and/or any other engine section. Alternatively, the turbine engine assembly 10 may be included in a direct drive turbine engine configured without a gear train. The turbine engine assembly 10 may be included in a turbine engine configured with a single spool, with two spools (e.g., see FIG. 9), or with more than two spools. The turbine engine may be configured as a turbofan engine, a turbojet engine, a turboprop engine, a turboshaft engine, a propfan engine, a pusher fan engine or any other type of turbine engine. The turbine engine may alternatively be configured as an auxiliary power unit (APU) or an industrial gas turbine engine. The present disclosure therefore is not limited to any particular types or configurations of turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for a turbine engine, comprising:
a first rotating structure configured to rotate about a rotational axis;
a turbine engine apparatus including an electric machine and a second rotating structure, the electric machine including an electric machine rotor and an electric machine stator, the second rotating structure configured to rotate about the rotational axis and coupled to the electric machine rotor;
a rotating coupler extending axially along the rotational axis from a first end of the rotating coupler to a second end of the rotating coupler, the rotating coupler coupled to the first rotating structure by a first connection located at the first end of the rotating coupler, and the rotating coupler coupled to the second rotating structure by a second connection located at the second end of the rotating coupler; and
a seal assembly including a rotating seal land and a stationary seal element, the rotating seal land mounted onto the rotating coupler, and the stationary seal element sealingly engaging the rotating seal land.

2. The assembly of claim 1, wherein the electric machine is configurable as at least one of
a motor during a motor mode of operation; or
a generator during a generator mode of operation.

3. The assembly of claim 1, wherein the rotating seal land is arranged axially between the first connection and the second connection along the rotational axis.

4. The assembly of claim 1, further comprising:
a bearing rotatably supporting the first rotating structure;
a first lubricant circuit configured to provide lubricant to the electric machine; and
a second lubricant circuit configured to provide lubricant to the bearing.

5. The assembly of claim 4, further comprising a lubricant source fluidly coupled in parallel with the first lubricant circuit and the second lubricant circuit.

6. The assembly of claim 4, further comprising:
a first lubricant source fluidly coupled with the first lubricant circuit; and
a second lubricant source fluidly coupled with the second lubricant circuit.

7. The assembly of claim 1, further comprising:
a bearing rotatably supporting the first rotating structure;
a first lubricant circuit configured to provide first lubricant to the electric machine; and
a second lubricant circuit configured to provide second lubricant to the bearing;
the turbine engine apparatus further comprising a gearbox for the electric machine; and
the first lubricant circuit further configured to provide the first lubricant to the gearbox.

8. The assembly of claim 1, further comprising:
a bearing rotatably supporting the first rotating structure;
a first lubricant circuit configured to provide first lubricant to the electric machine;
a second lubricant circuit configured to provide second lubricant to the bearing; and
a gearbox for the electric machine;
the second lubricant circuit further configured to provide the second lubricant to the gearbox.

9. The assembly of claim 1, wherein the first rotating structure comprises a turbine engine shaft coupled to the rotating coupler by the first connection.

10. The assembly of claim 9, wherein the first rotating structure further comprises a bladed rotor connected to the turbine engine shaft.

11. The assembly of claim 1, wherein the first rotating structure comprises a gear in a gearbox for the electric machine.

12. The assembly of claim 1, wherein the second rotating structure comprises a gear in a gearbox for the electric machine.

13. The assembly of claim 1, wherein
the second rotating structure comprises an electric machine shaft; and
the electric machine rotor is mounted to the electric machine shaft.

14. The assembly of claim 1, wherein the second rotating structure comprises the electric machine rotor.

15. The assembly of claim 1, wherein the rotating coupler comprises a flexible coupling disposed axially between the first connection and the second connection.

16. The assembly of claim 1, further comprising:
a compressor section, a combustor section, a turbine section and a flowpath extending sequentially through the compressor section, the combustor section and the turbine section;
the turbine engine apparatus radially inboard of the flowpath.

17. An assembly for a turbine engine, comprising:
a turbine engine shaft configured to rotate about a rotational axis;
a turbine engine module including an electric machine and a gearbox, the electric machine including an electric machine rotor and an electric machine stator, the gearbox including a rotating structure coupled to the electric machine rotor, and the rotating structure configured to rotate about the rotational axis;
a rotating coupler coupled to the turbine engine shaft by a coupler-shaft spline connection, and the rotating coupler coupled to the rotating structure by a coupler-gearbox spline connection; and
a seal assembly including a rotating seal land and a stationary seal element, the rotating seal land mounted onto the rotating coupler, and the stationary seal element sealingly engaging the rotating seal land.

18. The assembly of claim 17, further comprising:
a bearing rotatably supporting the turbine engine shaft;
a first lubricant circuit configured to provide lubricant to the turbine engine module; and
a second lubricant circuit configured to provide lubricant to the bearing.

19. An assembly for a turbine engine, comprising:
a gearbox comprising a gearbox rotating structure configured to rotate about a rotational axis;
a turbine engine module including an electric machine and a rotating structure, the electric machine including an electric machine rotor and an electric machine stator, the rotating structure configured to rotate about the rotational axis, and the rotating structure comprises or is coupled to the electric machine rotor;

a rotating coupler coupled to the gearbox rotating structure by a coupler-gearbox connection, the rotating coupler coupled to the rotating structure by a coupler-electric machine connection, and the rotating coupler configured as a quill shaft; and
a seal assembly including a rotating seal land and a stationary seal element, the rotating seal land mounted onto the rotating coupler, and the stationary seal element sealingly engaging the rotating seal land.

20. The assembly of claim 19, further comprising:
a first lubricant circuit configured to provide lubricant to the gearbox; and
a second lubricant circuit configured to provide lubricant to the electric machine.

* * * * *